United States Patent
Jin et al.

(10) Patent No.: US 11,463,013 B2
(45) Date of Patent: Oct. 4, 2022

(54) MAGNETIC ELEMENT, POWER MODULE AND POWER CONVERSION SYSTEM

(71) Applicant: Delta Electronics (Shanghai) Co., Ltd., Shanghai (CN)

(72) Inventors: Da Jin, Shanghai (CN); Kunpeng Wang, Shanghai (CN); Shuailin Du, Shanghai (CN); Kai Dong, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 76 days.

(21) Appl. No.: 17/170,552

(22) Filed: Feb. 8, 2021

(65) Prior Publication Data

US 2021/0305906 A1    Sep. 30, 2021

(30) Foreign Application Priority Data

Mar. 25, 2020    (CN) .......................... 202010217003.6

(51) Int. Cl.
*H02M 7/00* (2006.01)
*H01F 27/28* (2006.01)
*H01F 27/24* (2006.01)
*H02M 3/335* (2006.01)

(52) U.S. Cl.
CPC ............ *H02M 7/003* (2013.01); *H01F 27/24* (2013.01); *H01F 27/28* (2013.01); *H02M 3/33592* (2013.01)

(58) Field of Classification Search
CPC ... H02M 7/003; H02M 3/33592; H01F 27/24; H01F 27/28
See application file for complete search history.

(56) References Cited

U.S. PATENT DOCUMENTS

| | | | |
|---|---|---|---|
| 5,631,822 A | 5/1997 | Silberkleit et al. | |
| 7,633,369 B2 | 12/2009 | Chandrasekaran et al. | |
| 2005/0024179 A1 | 2/2005 | Chandrasekaran et al. | |
| 2012/0293293 A1* | 11/2012 | Huang | H01F 3/14 336/212 |
| 2017/0345541 A1* | 11/2017 | Yang | H01F 3/10 |

FOREIGN PATENT DOCUMENTS

| | | |
|---|---|---|
| CN | 204349813 U | 5/2015 |
| CN | 208507431 U | 2/2019 |
| CN | 105449987 B | 6/2019 |

* cited by examiner

*Primary Examiner* — Adolf D Berhane
*Assistant Examiner* — Afework S Demisse
(74) *Attorney, Agent, or Firm* — Kirton McConkie; Evan R. Witt

(57) ABSTRACT

A magnetic element, a power module and a power conversion system are provided. The magnetic element includes a main body, a plurality of first magnetic posts, a first common magnetic post and a second magnetic post. A first lateral edge and a second lateral edge of the main body are opposite to each other and extended along a first direction. A third lateral edge and a fourth lateral edge of the main body are opposite to each other and extended along a second direction. The plurality of first magnetic posts are disposed on the main body and arranged along the first direction. The first common magnetic post is disposed on the main body and located at the first magnetic posts. The second magnetic post is disposed on the main body and located at the first common magnetic post.

23 Claims, 8 Drawing Sheets

MAGNETIC ELEMENT, POWER MODULE AND POWER CONVERSION SYSTEM

CROSS-REFERENCE TO RELATED APPLICATION

This application claims priority to China Patent Application No. 202010217003.6, filed on Mar. 25, 2020. The entire contents of the above-mentioned patent application are incorporated herein by reference for all purposes.

FIELD OF THE INVENTION

The present disclosure relates to a magnetic element, a power module and a power conversion system, and more particularly to a magnetic element, a power module and a power conversion system with high utilization of printed circuit board (PCB).

BACKGROUND OF THE INVENTION

For the purpose of increasing power density and automatable manufacturability and reducing manufacturing cost, modular design is becoming increasingly popular in server and networking power supply. Generally, a modular circuit board is installed on a system board, and the power components are disposed on the modular board, including semiconductor and magnetic elements, etc. For most server and networking power supplies, the designed height is 1 U. Consequently, the height of the modular circuit board is limited. Moreover, the volume, weight and power loss of the magnetic element takes up a great proportion of those of the modular circuit board. Therefore, the design of the magnetic element is vital to the modular design.

The magnetic element with a planar structure is widely used in modular design due to its small volume and accessibility of PCB winding. For an LLC resonant converter, the magnetic element on the modular circuit board usually includes a resonant inductor magnetic post and a transformer magnetic post. The resonant inductor magnetic post and the transformer magnetic post are arranged side by side along the horizontal direction. Moreover, only the space between the transformer magnetic post and the edge of the modular circuit board can be used to accommodate the power components which are connected with the winding of the transformer. Whereas, the space between the resonant inductor magnetic post and the edge of the modular circuit board cannot be utilized.

SUMMARY OF THE INVENTION

The present disclosure provides a magnetic element, a power module and a power conversion system with high PCB utilization.

In accordance with an aspect of the present disclosure, a magnetic element is provided. The magnetic element includes a main body, a plurality of first magnetic posts, a first common magnetic post and a second magnetic post. The main body includes a first lateral edge, a second lateral edge, a third lateral edge and a fourth lateral edge. The first lateral edge and the second lateral edge are opposite to each other and extended along a first direction. The third lateral edge and the fourth lateral edge are opposite to each other and extended along a second direction. The third lateral edge and the fourth lateral edge are arranged between the first lateral edge and the second lateral edge, respectively. The plurality of first magnetic posts are disposed on the main body and arranged along the first direction. The plurality of first magnetic posts have a first side and a second side, the first side of the plurality of first magnetic posts is close to the first lateral edge, and the second side of the plurality of first magnetic posts is away from the first lateral edge. The first common magnetic post is disposed on the main body and located at the second side of the plurality of first magnetic posts. The first common magnetic post has a first side and a second side, the first side of the first common magnetic post is away from the first lateral edge, the second side of the first common magnetic post is away from the first lateral edge, and the first common magnetic post is extended along the first direction. The second magnetic post is disposed on the main body and located at the second side of the first common magnetic post. The plurality of first magnetic posts, the first common magnetic post and the second magnetic post are sequentially and arranged along the second direction In accordance with another aspect of the present disclosure, a magnetic element is provided. The magnetic element includes a first main body, a plurality of first magnetic posts, two lateral posts, a second main body, a second magnetic post and a third magnetic post. The first main body includes a first lateral edge, a second lateral edge, a third lateral edge and a fourth lateral edge. The first lateral edge and the second lateral edge are opposite to each other and extended along a first direction. The third lateral edge and the fourth lateral edge are opposite to each other and extended along a second direction. The third lateral edge and the fourth lateral edge are arranged between the first lateral edge and the second lateral edge. The plurality of first magnetic posts are disposed on the first main body and arranged along the first direction. The two lateral posts are disposed on the first main body and located on the third lateral edge and the fourth lateral edge of the first main body, respectively. The second main body is disposed beside the first main body along the second direction. The second magnetic post is disposed on the second main body and extended along the first direction. The fifth magnetic post is disposed on the second main body and extended along the first direction. The fifth magnetic post is separated from the second magnetic post.

In accordance with another aspect of the present disclosure, a power module is provided. The power module is perpendicularly mounted on a first circuit board. The power module includes a second circuit board, a magnetic element, at least one output terminal and a secondary side circuit. The second circuit board includes a wiring part. The magnetic element is disposed on the second circuit board and includes a main body, a plurality of first magnetic posts a first common magnetic post and a second magnetic post. The main body includes a first lateral edge, a second lateral edge, a third lateral edge and a fourth lateral edge. The first lateral edge and the second lateral edge are opposite to each other and extended along a first direction. The third lateral edge and the fourth lateral edge are opposite to each other and extended along a second direction. The third lateral edge and the fourth lateral edge are arranged between the first lateral edge and the second lateral edge. The plurality of first magnetic posts are disposed on the main body and arranged along the first direction. The plurality of first magnetic posts have a first side and a second side. The first side of the plurality of first magnetic posts is close to the first lateral edge, and the second side of the plurality of first magnetic posts is away from the first lateral edge. The first common magnetic post is disposed on the main body and located at the second side of the plurality of first magnetic posts. The first common magnetic post has a first side and a second side. The first side of the first common magnetic post is away from the first lateral edge. The second side of the first common magnetic post is away from the first lateral edge, and the first common magnetic post is extended along the first direction. The second magnetic post is disposed on the main body and located at the second side of the first common magnetic post. The plurality of first magnetic posts, the first common magnetic post and the second magnetic post are sequentially arranged along the second direction. The secondary side circuit includes an output rectifier circuit. The wiring part of the second circuit board is located beside the first lateral edge of the main body or the first lateral edge of the first main body and located near the output terminal. The secondary side circuit is disposed on the wiring part. The second circuit board is perpendicularly mounted on the first circuit board through the output terminal.

In accordance with another aspect of the present disclosure, a power conversion system is provided. The power conversion system includes a first circuit board, a second circuit board, a magnetic element, a primary side circuit and a secondary side circuit. The second circuit board is perpendicularly mounted on the first circuit board through at least one output terminal. The second circuit board includes a wiring part. The magnetic element is disposed on the second circuit board and has a structure as described above. The primary side circuit includes an inverter circuit and a resonant capacitor, and the resonant capacitor and the magnetic element form a resonant circuit. The resonant circuit is electrically connected with the inverter circuit in cascade. The secondary side circuit includes an output rectifier circuit. The primary side circuit and the secondary side circuit are isolated from each other through the magnetic element. The wiring part of the second circuit board is located beside the first lateral edge of the main body or the first lateral edge of the first main body and located near the output terminal. The secondary side circuit is disposed on the wiring part.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
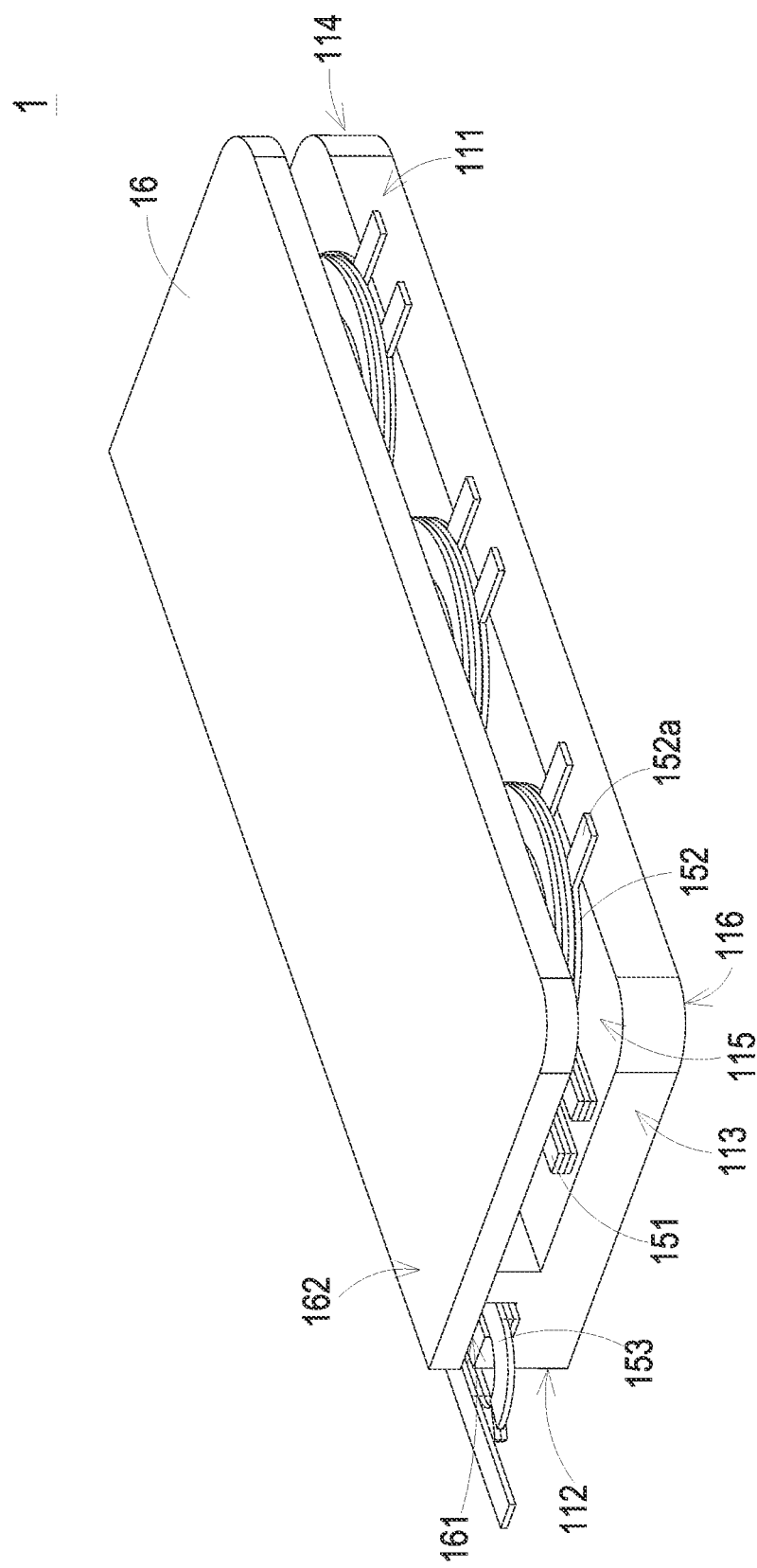
FIG. 1 is a schematic perspective view illustrating the structure of a magnetic element according to a first embodiment of the present disclosure.
Figure 2:
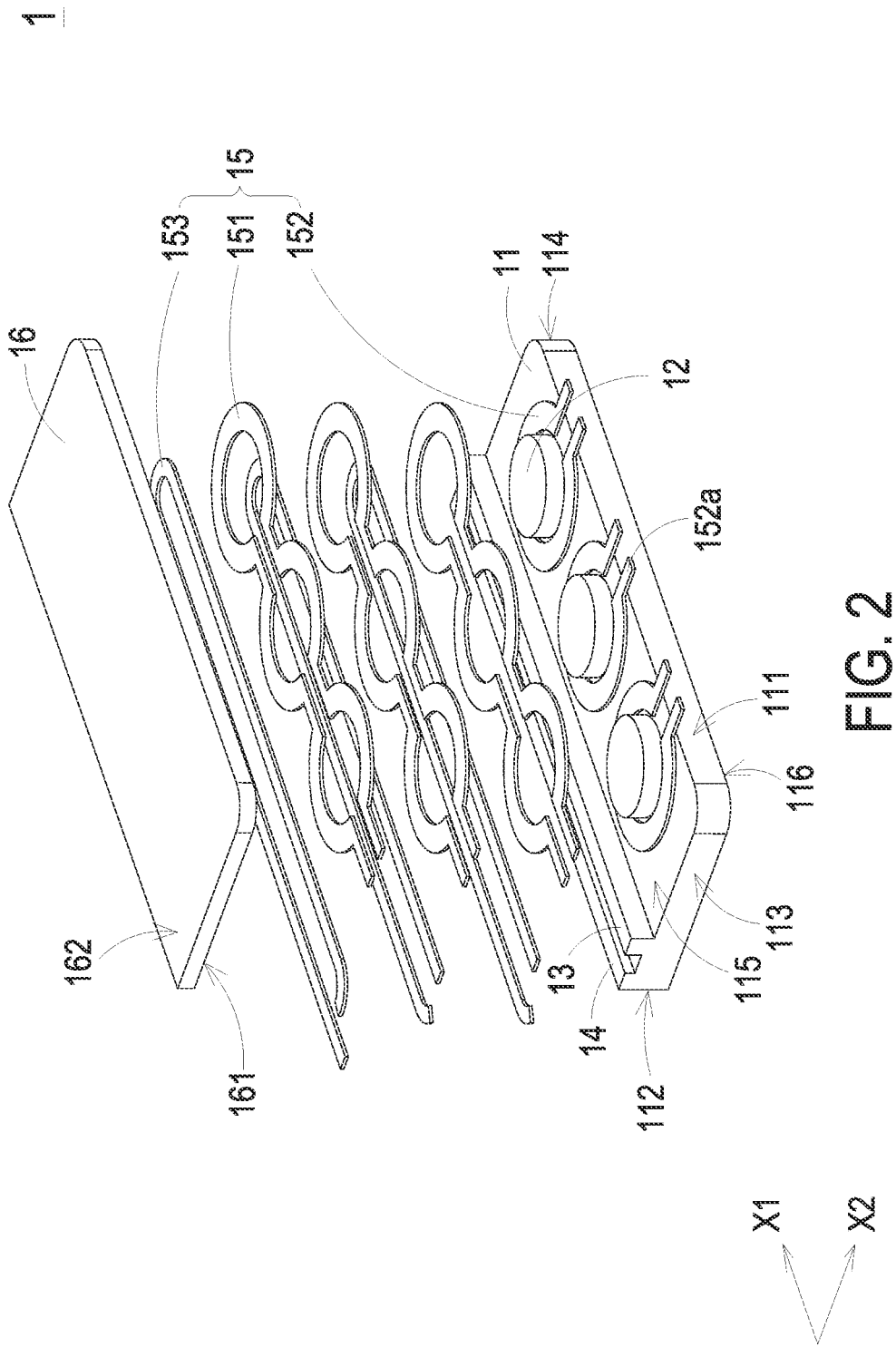
FIG. 2 is a schematic exploded view illustrating the magnetic element as shown in FIG. 1.
Figure 3:
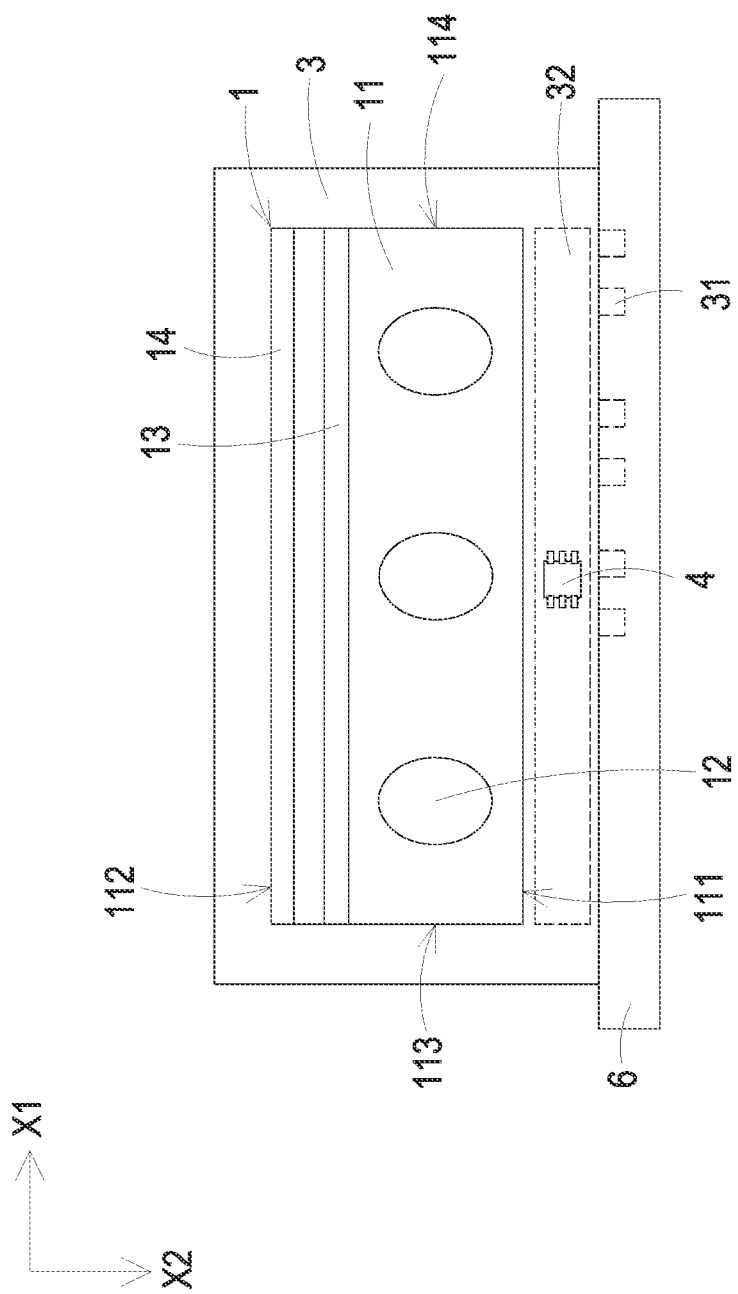
FIG. 3 is a schematic top view illustrating a portion of the magnetic element as shown in FIG. 1 and a circuit board.
Figure 4:
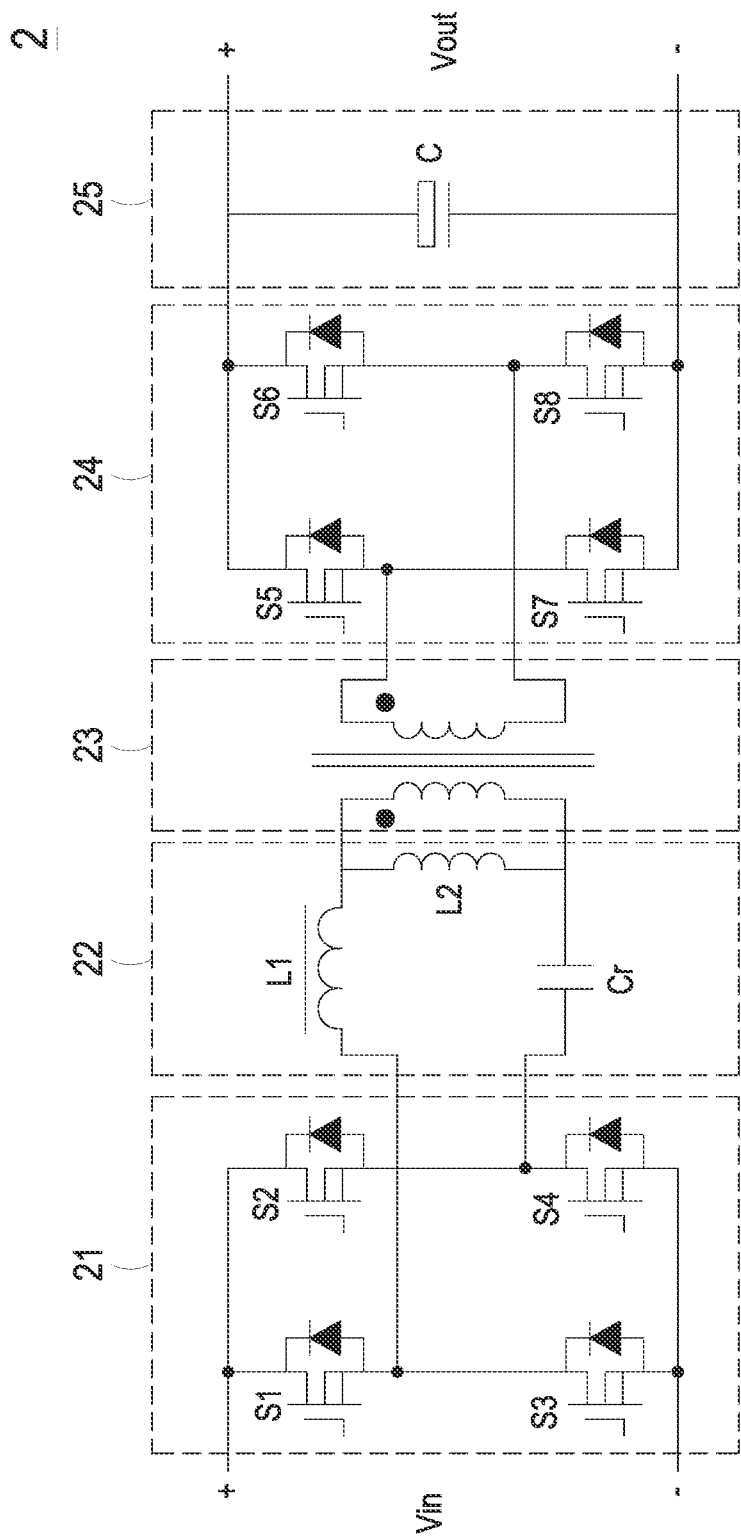
FIG. 4 is an equivalent circuit of a resonant converter including the magnetic element as shown in FIG. 1.

FIG. 1 is a schematic perspective view illustrating the structure of a magnetic element according to a first embodiment of the present disclosure. FIG. 2 is a schematic exploded view illustrating the magnetic element as shown in FIG. 1. FIG. 3 is a schematic top view illustrating a portion of the magnetic element as shown in FIG. 1 and a circuit board. FIG. 4 is an equivalent circuit of a resonant converter including the magnetic element as shown in FIG. 1. As shown in FIGS. 1, 2, 3 and 4, in this embodiment, the magnetic element 1 is applied to a resonant converter 2, and the resonant converter 2 is an LLC resonant converter. Alternatively, the resonant converter 2 is an SRC resonant converter or an LCLC resonant converter. The resonant converter 2 includes an inverter circuit 21, a resonant circuit 22, an isolation transformer 23, an output rectifier circuit 24 and an output filter circuit 25.

The inverter circuit 21 receives an input voltage Vin. In this embodiment, the inverter circuit 21 is a full-bridge inverter circuit. The inverter circuit 21 includes a plurality of switches S1, S2, S3 and S4. It is noted that the example of the inverter circuit 21 is not restricted. For example, in another embodiment, the inverter circuit 21 is a half-bridge inverter circuit.

The resonant circuit 22 is electrically cascaded with the inverter circuit 21. In this embodiment, the resonant circuit 22 is an LLC resonant circuit. The resonant circuit 22 includes two inductors L1, L2 and a resonant capacitor Cr. The inductor L2 is an external inductor or a magnetizing inductor of the isolation transformer 23. It is noted that the example of the resonant circuit 22 is not restricted. For example, in another embodiment, the resonant circuit 22 is an SRC resonant circuit or an LCLC resonant circuit.

The isolation transformer 23 is electrically connected with the resonant circuit 22 in the purpose of converting the input voltage Vin.

The output rectifier circuit 24 is electrically connected with the isolation transformer 23. An AC voltage from the isolation transformer 23 is rectified by the output rectifier circuit 24. In this embodiment, the output rectifier circuit 24 is a full-bridge rectifier circuit, which includes a plurality of switches S5, S6, S7 and S8. It is noted that the example of the output rectifier circuit 24 is not restricted. For example, in another embodiment, the output rectifier circuit 24 is a center-taped rectifier circuit.

The output filter circuit 25 is electrically connected with the output rectifier circuit 24. The output filter circuit 25 outputs a rectified output voltage Vout. In this embodiment, the output filter circuit 25 includes a capacitor C. It is noted that the example of the output filter circuit 25 is not restricted. For example, in another embodiment, the output filter circuit 25 includes a plurality of capacitors and a plurality of inductors, which are connected with each other in parallel and/or in series.

In an embodiment, the inverter circuit 21 and the resonant capacitor Cr of the resonant circuit 22 are collaboratively formed as a primary side circuit of the resonant converter 2, and the output rectifier circuit 24 and the output filter circuit 25 are collaboratively formed as a secondary side circuit of the resonant converter 2. The inductors of the resonant circuit 22 and the isolation transformer 23 are collaboratively formed as the magnetic element 1. The resonant capacitor Cr and the magnetic element 1 form the resonant circuit 22. The primary side circuit and the secondary side circuit of the resonant converter 2 are isolated from each other through the magnetic element 1. In other words, the resonant converter 2 includes the primary side circuit, the secondary side circuit and the magnetic element 1.

Please refer to FIG. 3. In this embodiment, the magnetic element 1, the secondary side circuit 4 and the primary side circuit (not shown) are disposed on a second circuit board 3 and collaboratively formed as a power module. Alternatively, the magnetic element 1 and the secondary side circuit 4 are disposed on a second circuit board 3 and collaboratively formed as a power module, and the primary side circuit is disposed on a first circuit board 6. In some embodiments, the second circuit board 3 further includes at least one output terminal 31 and a wiring part 32. Preferably, the second circuit board 3 includes a plurality of output terminals 31. The second circuit board 3 is perpendicularly mounted on the first circuit board 6 through the output terminals 31, and thus a power conversion system is produced. The wiring part 32 of the second circuit board 3 is arranged between the magnetic element 1 and the output terminals 31 and located near the output terminals 31. The secondary side circuit 4 is disposed on the wiring part 32 of the second circuit board 3.

Please refer to FIGS. 1 and 2. In this embodiment, the magnetic element 1 includes a first main body 11, a plurality of first magnetic posts 12, a first common magnetic post 13 and a second magnetic post 14. The first main body 11 includes a first lateral edge 111, a second lateral edge 112, a third lateral edge 113, a fourth lateral edge 114, a first surface 115 and a second surface 116. The first lateral edge 111 and the second lateral edge 112 are opposite to each other. Moreover, the first lateral edge 111 and the second lateral edge 112 are extended along a first direction X1. The first lateral edge 111 is located beside the wiring part 32. The third lateral edge 113 and the fourth lateral edge 114 are opposite to each other. Moreover, the third lateral edge 113 and the fourth lateral edge 114 are extended along a second direction X2. The third lateral edge 113 and the fourth lateral edge 114 are arranged between the first lateral edge 111 and the second lateral edge 112, respectively. The first surface 115 and the second surface 116 are opposite to each other. When the magnetic element 1 is installed on the second circuit board 3, the first surface 115 of the first main body 11 is in contact with a top surface of the second circuit board 3.

Preferably but not exclusively, the plurality of first magnetic posts 12 are served as winding posts of the isolation transformer. In the embodiment of FIG. 2, the number of the plurality of first magnetic posts 12 is 3. The number of the plurality of first magnetic posts 12 is not limited and may be varied according to the power requirement of the isolation transformer. The plurality of first magnetic posts 12 are disposed on the first surface 115 of the first main body 11 and arranged along the first direction X1. Moreover, a first side of each first magnetic post 12 is close to the first lateral edge 111, and a second side of each first magnetic post 12 is away from the first lateral edge 111. In some embodiments, the cross section of each first magnetic post 12 is a circular, an elliptic, a rectangular or a track. The first common magnetic post 13 is disposed on the first surface 115 of the first main body 11 and located at the second side of each first magnetic post 12. The first common magnetic post 13 has a first side and a second side, the first side of the first common magnetic post 13 is away from the first lateral edge 111, the second side of the first common magnetic post 13 is away from the first lateral edge 111, and the first common magnetic post 13 is extended along the first direction X1. Preferably but not exclusively, the second magnetic post 14 is served as winding post of the inductor. For example, the second magnetic post 14 is strip-shaped. The second magnetic post 14 is disposed on the first surface 115 of the first main body 11. The second magnetic post 14 is extended along the first direction X1. Moreover, the second magnetic post 14 is located at the second side of the first common magnetic post 13. That is, the first common magnetic post 13 is arranged between the second magnetic post 14 and the plurality of first magnetic posts 12. That is, the plurality of first magnetic posts 12, the first common magnetic post 13 and the second magnetic post 14 are sequentially arranged on the first surface 115 of the first main body 11 along the second direction X2.

As mentioned above, the plurality of first magnetic posts 12 and the second magnetic post 14 of the magnetic element 1 are arranged along the second direction X2. The plurality of first magnetic posts 12 are located near the first lateral edge 111. The second magnetic post 14 is close to the second lateral edge 112 and away from the first lateral edge 111.

When the magnetic element 1 is disposed on the second circuit board 3, the wiring part 32 of the second circuit board 3 is arranged between the first lateral edge 111 of the magnetic element 1 and the output terminals 31, and the wiring part 32 is located near the first circuit board 6. Namely, the wiring part 32 of the second circuit board 3 is located between the first lateral edge 111 of the magnetic element 1 and the first circuit board 6. Consequently, the secondary side circuit 4 can be located at any position of the wiring part 32 of the second circuit board 3. That is, the secondary side circuit 4 can be disposed on the second circuit board 3 and located at any position between the magnetic element 1 and the first circuit board 6. As previously described, it is difficult to place the power component in the space between the inductor winding post on the modular circuit board and the edge of the modular circuit board. When the magnetic element 1 is disposed on the second circuit board 3 according to the technology of the present disclosure, utilization of the printed circuit board (PCB) is enhanced.

In this embodiment, the magnetic element 1 further includes a winding assembly 15. The winding assembly 15 includes a plurality of primary windings 151, a plurality of secondary windings 152 and a plurality of inductor windings 153. The plurality of primary windings 151 and the plurality of secondary windings 152 are windings for the isolation transformer 23. Each primary winding 151 is wound around the plurality of first magnetic posts 12. Each secondary winding 152 is wound around the corresponding first magnetic post 12. For reducing the power loss, the plurality of primary windings 151 and the plurality of secondary windings 152 are alternatingly arranged. Moreover, the plurality of secondary windings 152 are placed on the first surface 115 of the first main body 11. Consequently, the outlet parts 152a of the secondary windings 152 are protruded out through the first lateral edge 111 in the direction away from the second magnetic post 14. The outlet parts 152a of the secondary windings 152 are connected with the secondary side circuit 4. Each inductor winding 153 is wound around the second magnetic post 14.

Preferably but not exclusively, each of the plurality of primary windings 151, the plurality of secondary windings 152 and the plurality of inductor windings 153 is a flat coil, a copper foil coil or a PCB winding.

In an embodiment, the magnetic element 1 includes a one-piece magnetic cover 16. The magnetic cover 16 has a flat plate structure. The magnetic cover 16 has a first surface 161 and a second surface 162, which are opposite to each other. The first surface 161 of the magnetic cover 16 faces the first surface 115 of the first main body 11. The first main body 11, the plurality of first magnetic posts 12, the first common magnetic post 13 and the second magnetic post 14 are covered by the magnetic cover 16. Consequently, the first main body 11, the plurality of first magnetic posts 12, the first common magnetic post 13 and the second magnetic post 14 are arranged between the first surface 161 of the magnetic cover 16 and the second surface 116 of the first main body 11. When the magnetic element 1 is disposed on the second circuit board 3, the first surface 161 of the magnetic cover 16 is in contact with a bottom surface of the second circuit board 3. In this embodiment, the magnetic cover 16 has a flat plate structure. Moreover, a first position is formed between the magnetic cover 16 and the first magnetic posts 12, a second position is formed between the magnetic cover 16 and the first common magnetic post 13, and a third position is formed between the magnetic cover 16 and the second magnetic post 14. Especially, air gaps exist at any two of the first position, the second position and the third position.

Figure 5:
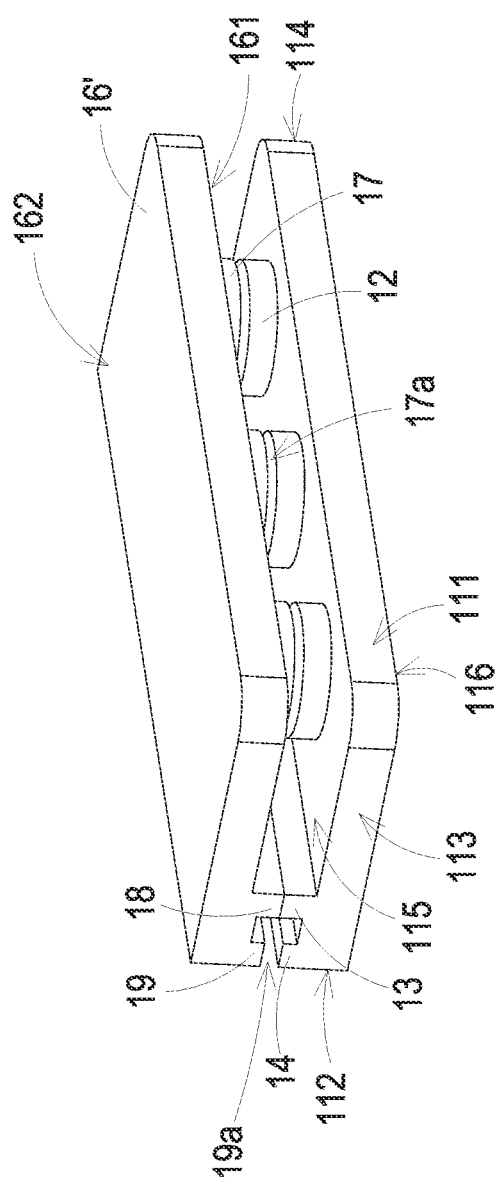
FIG. 5 is a schematic perspective view illustrating the structure of a magnetic element according to a second embodiment of the present disclosure.
Figure 6:
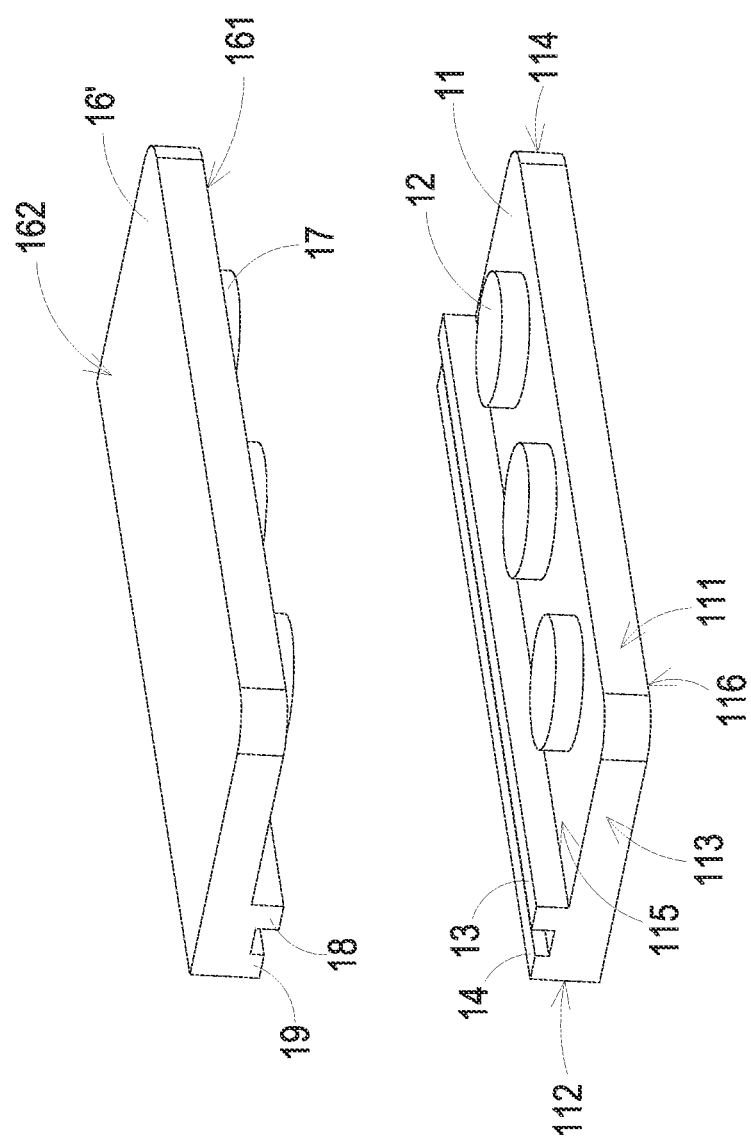
FIG. 6 is a schematic exploded view illustrating the magnetic element as shown in FIG. 5.

FIG. 5 is a schematic perspective view illustrating the structure of a magnetic element according to a second embodiment of the present disclosure. FIG. 6 is a schematic exploded view illustrating the magnetic element as shown in FIG. 5. As shown in FIGS. 5 and 6, the magnetic element 1b includes a first main body 11, a plurality of first magnetic posts 12, a first common magnetic post 13, a second magnetic post 14, a winding assembly (not shown) and a magnetic cover 16'. The structures and functions of the first main body 11, the plurality of first magnetic posts 12, the first common magnetic post 13, the second magnetic post 14 and the winding assembly are identical to those of the first embodiment, and not redundantly described herein. Component parts and elements corresponding to those of the first embodiment are designated by identical numeral references, and detailed descriptions thereof are omitted.

In comparison with the first embodiment, the magnetic cover 16' of the magnetic element 1b further includes a plurality of third magnetic posts 17, a second common magnetic post 18 and a fourth magnetic post 19. The plurality of third magnetic posts 17 are disposed on the first surface 161 of the magnetic cover 16' and respectively aligned with the corresponding first magnetic posts 12. An air gap 17a is formed between each third magnetic post 17 and the corresponding first magnetic post 12. The second common magnetic post 18 is disposed on the first surface 161 of the magnetic cover 16' and aligned with the first common magnetic post 13. Moreover, the second common magnetic post 18 is in contact with the first common magnetic post 13. The fourth magnetic post 19 is disposed on the first surface 161 of the magnetic cover 16' and aligned with the second magnetic post 14. An air gap 19a is formed between the fourth magnetic post 19 and the second magnetic post 14. In some other embodiments, a first position is formed between each third magnetic post 17 and the corresponding first magnetic post 12, a second position is formed between the second common magnetic post 18 and the first common magnetic post 13, and a third position is formed between the fourth magnetic post 19 and the second magnetic post 14. Especially, air gaps exist at any two of the first position, the second position and the third position.

Figure 7:
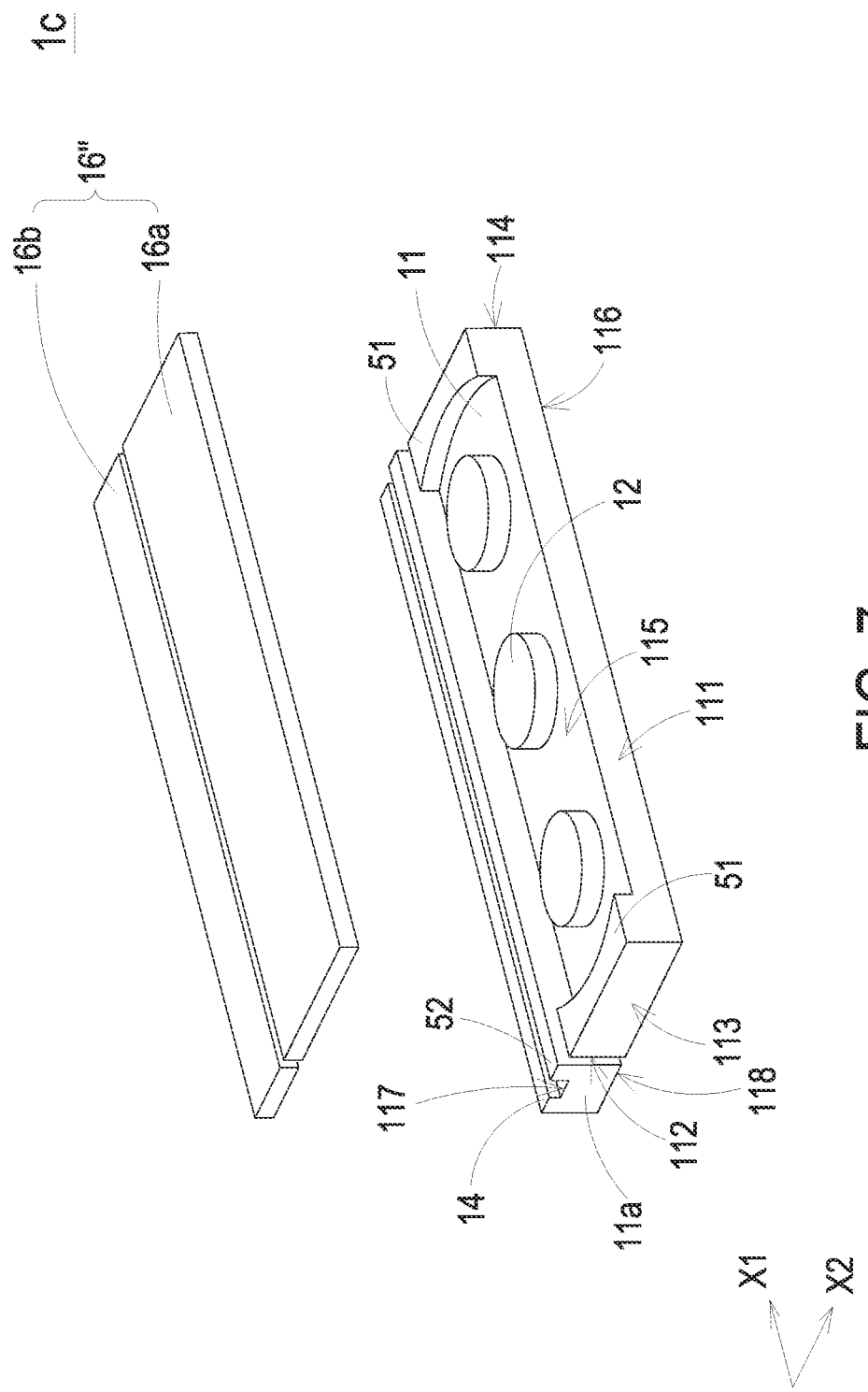
FIG. 7 is a schematic exploded view illustrating the structure of a magnetic element according to a third embodiment of the present disclosure.
Figure 8:
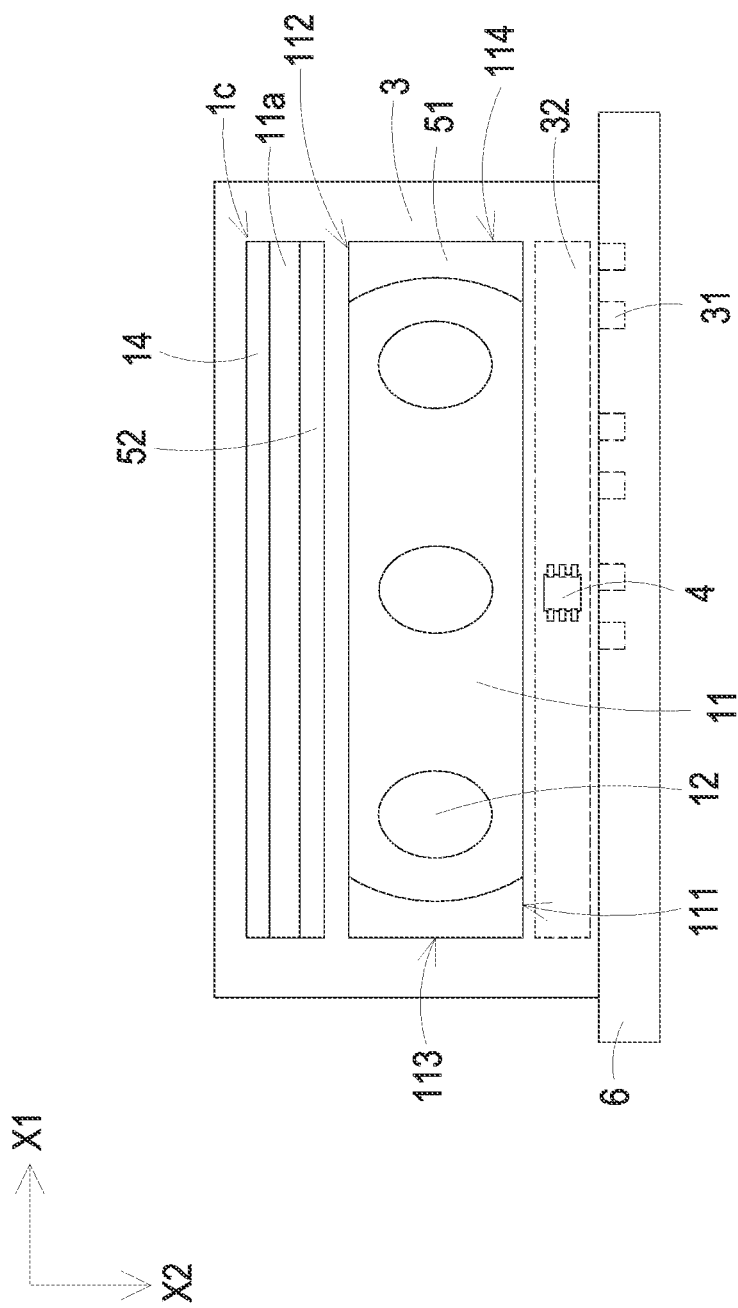
FIG. 8 is a schematic top view illustrating a portion of the magnetic element as shown in FIG. 7 and a circuit board.

FIG. 7 is a schematic exploded view illustrating the structure of a magnetic element according to a third embodiment of the present disclosure. FIG. 8 is a schematic top view illustrating a portion of the magnetic element as shown in FIG. 7 and a circuit board. As shown in FIGS. 7 and 8, the magnetic element 1c includes a first main body 11, a plurality of first magnetic posts 12, a second magnetic post 14, a winding assembly (not shown) and a magnetic cover 16". Component parts and elements corresponding to those of the first embodiment are designated by identical numeral references, and detailed descriptions thereof are omitted.

In this embodiment, the magnetic element 1c further includes a second main body 11a. The second main body 11a and the first main body 11 are separately disposed on the second circuit board 3. Moreover, the second main body 11a is located beside the first main body 11 along the second direction X2. That is, the first main body 11 is arranged between the second main body 11a and the wiring part 32 of the second circuit board 3. In this embodiment, the length of the first main body 11 and the length of the second main body 11a are equal. In some other embodiments, the length of the first main body 11 and the length of the second main body 11a may be different. In this embodiment, the second main body 11a includes a first surface 117 and a second surface 118. The first surface 117 of the second main body 11a is located beside the first surface 115 of the first main body 11. The second surface 118 is located beside the second surface 116 of the first main body 11. The second magnetic post 14 is disposed on the first surface 117 of the second main body 11a.

In comparison with the first embodiment, the magnetic element 1c of this embodiment omits the first common magnetic post 13, and the magnetic element 1c further includes two lateral posts 51 and a fifth magnetic post 52. The two lateral posts 51 are disposed on the first surface 115 of the first main body 11. In addition, the two lateral posts 51 are located on the third lateral edge 113 and the fourth lateral edge 114 of the first main body 11, respectively. Consequently, the plurality of first magnetic posts 12 are arranged between the two lateral posts 51. The fifth magnetic post 52 is disposed on the second main body 11a. The fifth magnetic post 52 is extended along the first direction X1. The fifth magnetic post 52 is located beside the second magnetic post 14 and separated from the second magnetic post 14. Moreover, the fifth magnetic post 52 is arranged between the second magnetic post 14 and the plurality of first magnetic posts 12. Preferably but not exclusively, the fifth magnetic post 52 is strip-shaped. In this embodiment, the inductor winding is wound around the fifth magnetic post 52 and/or the second magnetic post 14.

In this embodiment, the magnetic cover 16" of the magnetic element 1c includes a first cover part 16a and a second cover part 16b, which are separated from each other. The first cover part 16a is aligned with the first main body 11 to cover the first main body 11, the plurality of first magnetic posts 12 and the two lateral posts 51. The second cover part 16b is aligned with the second main body 11a to cover the second main body 11a, the second magnetic post 14 and the fifth magnetic post 52.

From the above descriptions, the magnetic element includes a plurality of first magnetic posts and a second magnetic post. The plurality of first magnetic posts are located beside the first lateral edge. The second magnetic post is located beside the second lateral edge and away from the first lateral edge. When the magnetic element is disposed on the second circuit board, the wiring part of the second circuit board is arranged between the first lateral edge and the first circuit board. Consequently, the secondary side circuit can be located at any position of the wiring part of the second circuit board. That is, the secondary side circuit can be disposed on the second circuit board and located at any position between the magnetic element and the first circuit board. In comparison with the conventional technology, the use of the magnetic element of the present disclosure has the enhanced PCB utilization.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A magnetic element, comprising:
a main body comprising a first lateral edge, a second lateral edge, a third lateral edge and a fourth lateral edge, wherein the first lateral edge and the second lateral edge are opposite to each other and extended along a first direction, the third lateral edge and the fourth lateral edge are opposite to each other and extended along a second direction, and the third lateral edge and the fourth lateral edge are arranged between the first lateral edge and the second lateral edge, respectively;
a plurality of first magnetic posts disposed on the main body and arranged along the first direction, wherein the plurality of first magnetic posts have a first side and a second side, the first side of the plurality of first magnetic posts is close to the first lateral edge, and the second side of the plurality of first magnetic posts is away from the first lateral edge;
a first common magnetic post disposed on the main body and located at the second side of the plurality of first magnetic posts, wherein the first common magnetic post has a first side and a second side, the first side of the first common magnetic post is away from the first lateral edge, the second side of the first common magnetic post is away from the first lateral edge, and the first common magnetic post is extended along the first direction; and
a second magnetic post disposed on the main body and located at the second side of the first common magnetic post,
wherein the plurality of first magnetic posts, the first common magnetic post and the second magnetic post are sequentially arranged along the second direction.

2. The magnetic element according to claim 1, wherein the magnetic element further comprises a winding assembly, and the winding assembly comprises a primary winding, a secondary winding and an inductor winding, wherein the primary winding and the secondary winding are wound around the plurality of first magnetic posts, and the inductor winding is wound around the second magnetic post.

3. The magnetic element according to claim 2, wherein each of the primary winding, the secondary winding and the inductor winding is a flat coil, a copper foil coil or a PCB winding.

4. The magnetic element according to claim 1, wherein the second magnetic post is strip-shaped.

5. The magnetic element according to claim 1, wherein a cross section of each first magnetic post is circular, elliptic, rectangular or track.

6. The magnetic element according to claim 1, further comprising a magnetic cover for covering the main body, the plurality of first magnetic posts and the second magnetic post.

7. The magnetic element according to claim 6, wherein the magnetic cover is a flat plate.

8. The magnetic element according to claim 6, wherein the magnetic cover further comprises a plurality of third magnetic posts, a second common magnetic post and a fourth magnetic post, the plurality of third magnetic posts are respectively aligned with the corresponding first magnetic posts, the second common magnetic post is aligned with the first common magnetic post, and the fourth magnetic post is aligned with the second magnetic post.

9. The magnetic element according to claim 6, wherein a first position is defined between the magnetic cover and the first magnetic posts, a second position is defined between the magnetic cover and the first common magnetic post, and a third position is defined between the magnetic cover and the second magnetic post, wherein air gaps exist at any two of the first position, the second position and the third position.

10. The magnetic element according to claim 1, wherein the magnetic element is included in a resonant converter.

11. The magnetic element according to claim 10, wherein the resonant converter is an LLC resonant converter, an SRC resonant converter or an LCLC resonant converter.

12. A magnetic element, comprising:
a first main body comprising a first lateral edge, a second lateral edge, a third lateral edge and a fourth lateral edge, wherein the first lateral edge and the second lateral edge are opposite to each other and extended along a first direction, the third lateral edge and the fourth lateral edge are opposite to each other and extended along a second direction, and the third lateral edge and the fourth lateral edge are arranged between the first lateral edge and the second lateral edge;
a plurality of first magnetic posts disposed on the first main body and arranged along the first direction;
two lateral posts disposed on the first main body and located on the third lateral edge and the fourth lateral edge of the first main body, respectively;
a second main body disposed beside the first main body along the second direction;
a second magnetic post disposed on the second main body and extended along the first direction; and
a fifth magnetic post disposed on the second main body and extended along the first direction, wherein the fifth magnetic post is separated from the second magnetic post.

13. The magnetic element according to claim 12, wherein the magnetic element further comprises a winding assembly, and the winding assembly comprises a primary winding, a secondary winding and an inductor winding, wherein the primary winding and the secondary winding are wound around the plurality of first magnetic posts, and the inductor winding is wound around the second magnetic post and/or the fifth magnetic post.

14. The magnetic element according to claim 12, wherein the magnetic element further comprises a magnetic cover, and the magnetic cover comprises a first cover part and a second cover part, wherein the first main body, the plurality of first magnetic posts and the two lateral posts are covered by the first cover part, and the second main body, the second magnetic post and the fifth magnetic post are covered by the second cover part.

15. The magnetic element according to claim 12, wherein the magnetic element is included in a resonant converter.

16. The magnetic element according to claim 15, wherein the resonant converter is an LLC resonant converter, an SRC resonant converter or an LCLC resonant converter.

17. A power module perpendicularly mounted on a first circuit board, the power module comprising:
- a second circuit board comprising a wiring part;
- a magnetic element disposed on the second circuit board, and comprising:
  - a main body comprising a first lateral edge, a second lateral edge, a third lateral edge and a fourth lateral edge, wherein the first lateral edge and the second lateral edge are opposite to each other and extended along a first direction, the third lateral edge and the fourth lateral edge are opposite to each other and extended along a second direction, and the third lateral edge and the fourth lateral edge are arranged between the first lateral edge and the second lateral edge;
  - a plurality of first magnetic posts disposed on the main body and arranged along the first direction, wherein the plurality of first magnetic posts have a first side and a second side, the first side of the plurality of first magnetic posts is close to the first lateral edge, and the second side of the plurality of first magnetic posts is away from the first lateral edge;
  - a first common magnetic post disposed on the main body and located at the second side of the plurality of first magnetic posts, wherein the first common magnetic post has a first side and a second side, the first side of the first common magnetic post is away from the first lateral edge, the second side of the first common magnetic post is away from the first lateral edge, and the first common magnetic post is extended along the first direction; and
  - a second magnetic post disposed on the main body and located at the second side of the first common magnetic post,
  - wherein the plurality of first magnetic posts, the first common magnetic post and the second magnetic post are sequentially arranged along the second direction;
- at least one output terminal; and
- a secondary side circuit comprising an output rectifier circuit,
- wherein the wiring part of the second circuit board is located beside the first lateral edge of the main body and located near the output terminal, the secondary side circuit is disposed on the wiring part, and the second circuit board is perpendicularly mounted on the first circuit board through the output terminal.

18. The power module according to claim 17, wherein the power module further comprises a primary side circuit, and the primary side circuit comprises an inverter circuit and a resonant capacitor, and the resonant capacitor and the magnetic element form a resonant circuit, wherein the resonant circuit is electrically connected with the inverter circuit in cascade, the primary side circuit and the secondary side circuit are isolated from each other through the magnetic element, and the primary side circuit is disposed on the second circuit board.

19. The power module according to claim 18, wherein the primary side circuit, the secondary side circuit and the magnetic element are collaboratively formed as a resonant converter.

20. The power module according to claim 19, wherein the resonant converter is an LLC resonant converter, an SRC resonant converter or an LCLC resonant converter.

21. A power conversion system, comprising:
- a first circuit board;
- a second circuit board perpendicularly mounted on the first circuit board through at least one output terminal, wherein the second circuit board comprises a wiring part;
- a magnetic element disposed on the second circuit board and comprising:
  - a main body comprising a first lateral edge, a second lateral edge, a third lateral edge and a fourth lateral edge, wherein the first lateral edge and the second lateral edge are opposite to each other and extended along a first direction, the third lateral edge and the fourth lateral edge are opposite to each other and extended along a second direction, and the third lateral edge and the fourth lateral edge are arranged between the first lateral edge and the second lateral edge;
  - a plurality of first magnetic posts disposed on the main body and arranged along the first direction, wherein the plurality of first magnetic posts have a first side and a second side, the first side of the plurality of first magnetic posts is close to the first lateral edge, and the second side of the plurality of first magnetic posts is away from the first lateral edge;
  - a first common magnetic post disposed on the main body and located at the second side of the plurality of first magnetic posts, wherein the first common magnetic post has a first side and a second side, the first side of the first common magnetic post is away from the first lateral edge, the second side of the first common magnetic post is away from the first lateral edge, and the first common magnetic post is extended along the first direction; and
  - a second magnetic post disposed on the main body and located at the second side of the first common magnetic post;
- a primary side circuit comprising an inverter circuit and a resonant capacitor, and the resonant capacitor and the magnetic element form a resonant circuit, wherein the resonant circuit is electrically connected with the inverter circuit in cascade; and
- a secondary side circuit comprising an output rectifier circuit, wherein the primary side circuit and the secondary side circuit are isolated from each other through the magnetic element,
- wherein the wiring part of the second circuit board is located beside the first lateral edge of the main body and located near the output terminal, and the secondary side circuit is disposed on the wiring part.

22. The power conversion system according to claim 21, wherein the primary side circuit, the secondary side circuit and the magnetic element are collaboratively formed as a resonant converter.

23. The power conversion system according to claim 22, wherein the resonant converter is an LLC resonant converter, an SRC resonant converter or an LCLC resonant converter.

* * * * *